United States Patent
Bonnieman et al.

(10) Patent No.: US 6,614,142 B1
(45) Date of Patent: Sep. 2, 2003

(54) ROTOR FOR AN ELECTRICAL MACHINE, AND AN ELECTRICAL MACHINE INCLUDING SUCH A ROTOR

(75) Inventors: David Bonnieman, Buckinghamshire (GB); Dennise R Hayward, Bedfordshire (GB)

(73) Assignee: Goodrich Control Systems Limited, Bedfordshire (GB)

( * ) Notice: Subject to any disclaimer, the term of this patent is extended or adjusted under 35 U.S.C. 154(b) by 0 days.

(21) Appl. No.: 09/565,601

(22) Filed: May 4, 2000

(30) Foreign Application Priority Data

May 5, 1999 (GB) ............................................. 9910392

(51) Int. Cl.⁷ .......................... H02K 1/00; H02K 1/06; H02K 1/28; H02K 1/22

(52) U.S. Cl. ..................... 310/216; 310/217; 310/218; 310/261; 310/264

(58) Field of Search ....................... 310/134.41, 156.51, 310/156.79, 261, 266, 216, 217, 218, 264, 270

(56) References Cited

U.S. PATENT DOCUMENTS

| | | | |
|---|---|---|---|
| 3,597,646 A | | 8/1971 | Lawrenson |
| 4,358,698 A | * | 11/1982 | Peterson et al. ............. 310/187 |
| 4,412,794 A | * | 11/1983 | Presley ........................ 310/82 |
| 4,490,638 A | * | 12/1984 | Lind ........................... 310/194 |
| 4,494,030 A | * | 1/1985 | Mulach et al. ............... 310/217 |
| 4,538,084 A | * | 8/1985 | Kawada et al. .............. 310/217 |
| 4,614,888 A | * | 9/1986 | Mosher et al. ............... 310/261 |
| 4,801,831 A | * | 1/1989 | Lewis .......................... 310/217 |
| 4,885,495 A | * | 12/1989 | Sisk ............................ 310/201 |
| 4,937,485 A | * | 6/1990 | Mihalko ....................... 310/12 |
| 5,218,252 A | * | 6/1993 | Iseman et al. ............... 310/217 |
| 5,519,275 A | * | 5/1996 | Scott et al. ................... 310/112 |
| 5,703,421 A | * | 12/1997 | Durkin ......................... 310/61 |
| 5,726,516 A | * | 3/1998 | Randall ........................ 310/261 |
| 5,909,076 A | * | 6/1999 | Smith .......................... 310/177 |
| 5,955,807 A | * | 9/1999 | Kajiura et al. ............... 310/156 |
| 6,177,750 B1 | * | 1/2001 | Tompkin ...................... 310/261 |
| 6,198,181 B1 | * | 3/2001 | Ali et al. ...................... 29/596 |
| 6,214,480 B1 | * | 4/2001 | Hosoe et al. ................. 428/615 |
| 6,311,383 B1 | * | 11/2001 | Umeda et al. ............... 29/592.1 |

FOREIGN PATENT DOCUMENTS

| | | |
|---|---|---|
| EP | 0426376 | 5/1991 |
| EP | 0736952 | 10/1996 |
| EP | 0798454 | 1/1997 |
| GB | 2216603 | 11/1989 |
| JP | 3-164039 | 7/1991 |

* cited by examiner

Primary Examiner—Nestor Ramirez
Assistant Examiner—Julio C. Gonzalez R.
(74) Attorney, Agent, or Firm—David I. Roche; Baker & McKenzie

(57) ABSTRACT

A rotor is provided for use at high speed. The rotor comprises a stack of laminations held under compression between opposed flanges. The laminations have a plurality of teeth. Some of the laminations have lugs having passages formed therein through which the bolts that hold the stack in compression pass. The laminations serve to hold bolts against radial deformation at high speed.

17 Claims, 5 Drawing Sheets

ROTOR FOR AN ELECTRICAL MACHINE, AND AN ELECTRICAL MACHINE INCLUDING SUCH A ROTOR

The present invention relates to a rotor for an electrical machine and to an electrical machine including such a rotor.

It is known to generate electricity by using an engine to drive a generator. However, in some installations, such as aircraft, it is desirable to ensure that electricity can still be generated whilst the aircraft is in flight, even if all of the engines have failed. The electrical power may then be used to power the essential electrical/hydraulic systems and initiate an engine restart sequence.

Traditionally, emergency electrical power for an aircraft following engine failure is provided by a ram air turbine, RAT, which comprises an electrical generator equipped with a propeller. Under normal operating conditions the RAT is located within the aircraft fuselage and provides no electrical output. Following an engine failure, the pilot may choose to deploy the RAT. During deployment the RAT is moved by a support arm so as to place it in the airstream. Thus the propeller is caused to rotate due to the airflow caused by the forward movement of the aircraft. However, RATs are relatively heavy items which, by their very nature, are difficult to test.

It is known that, during flame out conditions, the low pressure, LP, shaft of a gas turbine aircraft engine continues to rotate due to the airflow past the by-pass fan blades. GB 2216603 discloses an arrangement in which an emergency generator can be coupled to the low pressure shaft, also known as low speed spool, of an aircraft gas turbine engine via a coupling unit. A sensor is provided to detect when propulsive power is lost from the engine, and thereby to connect the emergency power generator to the low speed spool during the flame out conditions. EP 0798454 describes a multi spool engine in which each of the spools is independently and directly coupled to an electrical generator. This document also discloses that one of the generators may act as an emergency power source in the event of engine failure due to the windmilling of the low speed spool.

The windmill speed of the engine low pressure shaft at minimum flight speed is approximately 200 to 250 rpm. This effectively defines the minimum speed at which each generator on the low pressure shaft is required to produce a reasonable electrical output. In the context of current and proposed aircraft systems, it is to be expected that each generator will produce something in the region of 25 kW under these conditions.

It is essential that the generator is reliable and is also able to withstand the harsh conditions encountered in a gas turbine engine environment. It is therefore desirable that there be no rotating coils or the use of slip rings within the generator. A switched reluctance generator provides a device in which their are no electrical connections to the rotor. However, in order to produce the required output of approximately 25 kW at a rotational speed of 250 rpm, it is estimated that the generator would weight several hundred kg. This size and weight penalty is unacceptable within a gas turbine engine environment. The weight of the generator can be reduced if the rotational speed is increased, and if the generator is driven through a step up gear box, for example with a step up ratio of 12:1 such that the minimum generator speed is 3000 rpm, then the required 25 kW output can be obtained with a much smaller and lighter generator weighing around 20–40 kg. However, an aircraft gas turbine engine at full speed typically has a low pressure shaft speed in excess of 3000 rpm and consequently the generator speed with a 12:1 step up gear box would be in excess of 36,000 rpm. It is possible to provide a clutch arrangement to isolate the drive to the generator at higher engine speeds, although this provides a further component which may fail thereby possibly depriving the aircraft from electrical power under emergency conditions. It is therefore necessary, for reasons of reliability, to avoid the use of a clutch, thereby providing a generator which is continuously connected to the low pressure shaft and which, therefore, must be able to withstand continuous rotation at high speed without suffering mechanical damage.

According to a first aspect of the present invention there is provided a rotor for a switched reluctance electrical machine, comprising a shaft carrying a plurality of laminations having a plurality of regions of a first radius interposed between regions of a second radius, wherein the first radius is greater than the second radius; and in which some of the laminations are provided with extensions in some or all of the second regions, the extensions having passages formed therein, and the laminations being held together by attachment elements which pass through the passages in the extensions.

It is thus possible to provide a rotor in which laminations, and especially thin laminations, can be held together by compression whilst providing support for the attachment elements so as to protect them against damage due to centrifugal forces.

It is known that rotating conductive elements within a magnetic circuit will experience eddy currents therein. Eddy current losses are reduced by using a laminated structure for the rotor. In order to reduce eddy current losses, and thereby to improve efficiency, the laminae, also known as laminations, should be thin. Preferably the laminations are less than 0.3 mm thick. In a preferred embodiment of the present invention, the rotor carries 600 individual laminations of 50% cobalt iron material (Rotalloy 3), each lamination being 0.2 mm thick with an oxide deposit for insulation purposes. Whilst the use of such thin laminations reduces eddy currents within the machine, which is particularly important given the high rotational rates which may be experienced by the machine, the use of a laminated rotor gives rise to problems in the operation of the machine at high speeds. At high rates of rotation, the forces on the laminated rotor will cause it to deform axially towards the centre of its supported length, potentially intruding into the rotor air gap and contacting the stator leading to catastrophic failure of the machine.

The rigidity of the lamination pack (and hence the rotor) may be improved by externally welding the laminations together. However, external welding of the lamination pack would lead to electrical shorting of the laminations and thus high eddy current losses. Bonding of the laminations is also not preferred in that the strength of available bonding materials is insufficient to withstand the forces imposed by high speeds of rotation. In addition where the laminations are glued the thickness of glue would be significant compared to the thickness of the laminations, and therefore would result in less laminations being used if the physical size of the electrical machine remains constrained, or would require the use of a physically larger machine in order to achieve similar electrical performance. Given these problems, the preferred method for forming a sufficiently rigid rotor is to hold the laminations together under mechanical compression, using retaining members at an increased radius.

Preferably the laminations are held between first and second flanges. The flanges are secured, for example by welding, to the rotor shaft. Additionally, one of the flanges may be integrally formed with the rotor shaft. Preferably a plurality of bolts extend between the flanges, thereby enabling the lamination assembly to be held in a compressed state.

The rotor of a variable reluctance machine comprises a plurality of radially spaced projections known as poles. The maximum power handling of such a machine, be it as a motor or a generator, is dependant on the magnitude of the change in magnetic properties between the projections and the gaps between the projections. It is therefore beneficial to ensure that the bolts securing the stack of laminations together do not pass through the body of the projections since this reduces the amount of magnetic material within the projections, thereby significantly reducing the performance of the electrical machine. It is therefore preferable to run substantially non-magnetic bolts in the gaps between the projections. For fast electrical machines, the centrifugal forces acting on the bolts may result in considerable bending stresses occurring within the bolts. This may lead to failure of the bolts, resulting in destruction of the generator. Even if the bolts do not fail completely, there is a concern that they may distort to such a degree that they contact a stator assembly, again resulting in failure of the electrical machine. Increasing the thickness of the bolts is not a preferred solution since larger diameter bolts are more difficult to accommodate within the available space between the poles of the rotor and they also result in an increase in the rotating mass which in turn increases the stress on the bolts. The applicant has realised that the laminations themselves can provide support for the bolts at at least one position along the length of the rotor.

Preferably the laminations provided with the extensions are arranged in groups, such that a plurality of laminations with the extensions co-operate to form a support region which holds the attachment elements against distortion due to centrifugal force. Advantageously the groups are spaced apart in such a manner so as to provide support for the bolts at regular intervals along their length. Thus, for example, in a rotor only having one group of laminations with the extensions, the group of laminations is provided at substantially the halfway point along the lamination stack. For a rotor having two groups of laminations providing support, these are positioned at substantially ⅓ and ⅔ along the length of the lamination stack.

Preferably the bolts are insulated from the laminations in order to avoid eddy current losses. Advantageously insulating bushes are provided. The bushes prevent the bolts from touching the laminations. Similarly, insulation is provided between the bolts and the flanges, or at least between the bolts and one of the flanges in order that a complete electrical circuit is not made. It is thus possible to provide a rotor suitable for use at high rotational rates.

According to a second aspect of the present invention, there is provided an electrical machine comprising a rotor according to the first aspect of the present invention.

According to a third aspect of the present invention, there is provided a lamination having a plurality of projections thereon which form pole teeth, the lamination further comprising fixing support elements formed in a plurality of the inter-tooth regions.

The present invention will further be described, by way of example, with reference to the accompanying drawings, in which.

Figure 1:
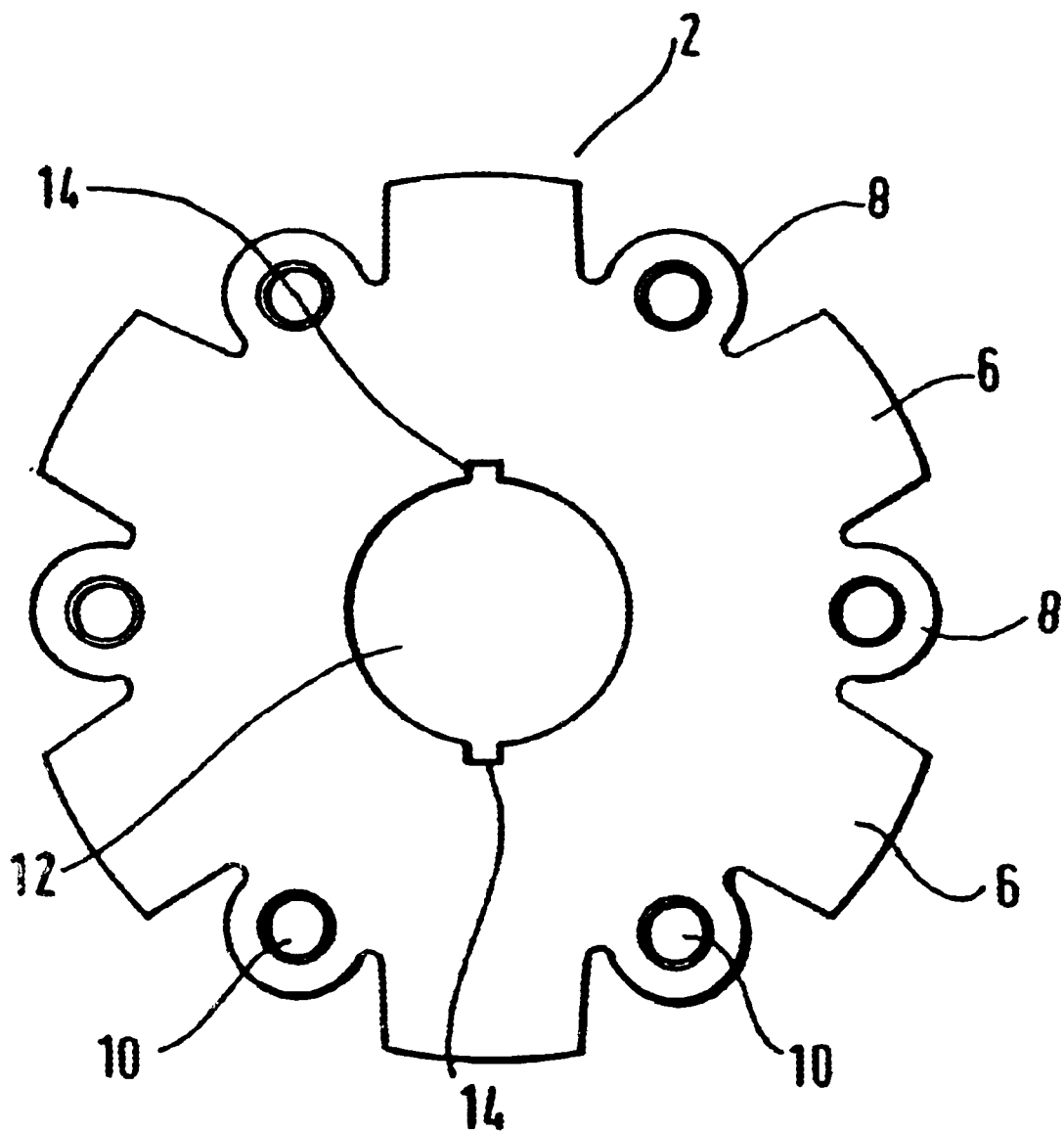
FIG. 1 is a plan view of a lamination constituting an embodiment of the present invention.

FIG. 1 shows an embodiment of a lamina (also known as lamination) 2 for use in the high speed rotary electrical machines. The lamination 2 comprises a generally circular central portion carrying a plurality of projections 6 spaced around its periphery. The projections 6 form pole pieces in the rotating machine. In order to minimise out of balance forces, the projections 6 are arranged in a regular array exhibiting two or more fold rotational symmetry. Attachment elements 8, in the form of lugs, project from the body of the lamination 2 into the inter pole spacing. The lugs 8 have through passages 10 formed therein in order to accept the passage of fixing elements. The passages 10 are completely enclosed within the lugs 8. The lamination is provided with a central aperture 12, sized so as to slidingly engage a rotor shaft of a rotating machine. The central aperture 12 is provided with locating notches 14 which, in use, engage on location splines formed on the rotor shaft. The lamination shown in FIG. 1 will hereinafter be called an attachment lamination in order to distinguish it from other laminations, hereinafter called rotor laminations which have poles in the same position and of the same size and shape of the attachment laminations but which do not have the lugs 8. The radially innermost portion of the poles 6 of the rotor laminations are joined together along a circular path whose radius of curvature corresponds to the radius at the innermost region of the pole 6.

Figure 2:
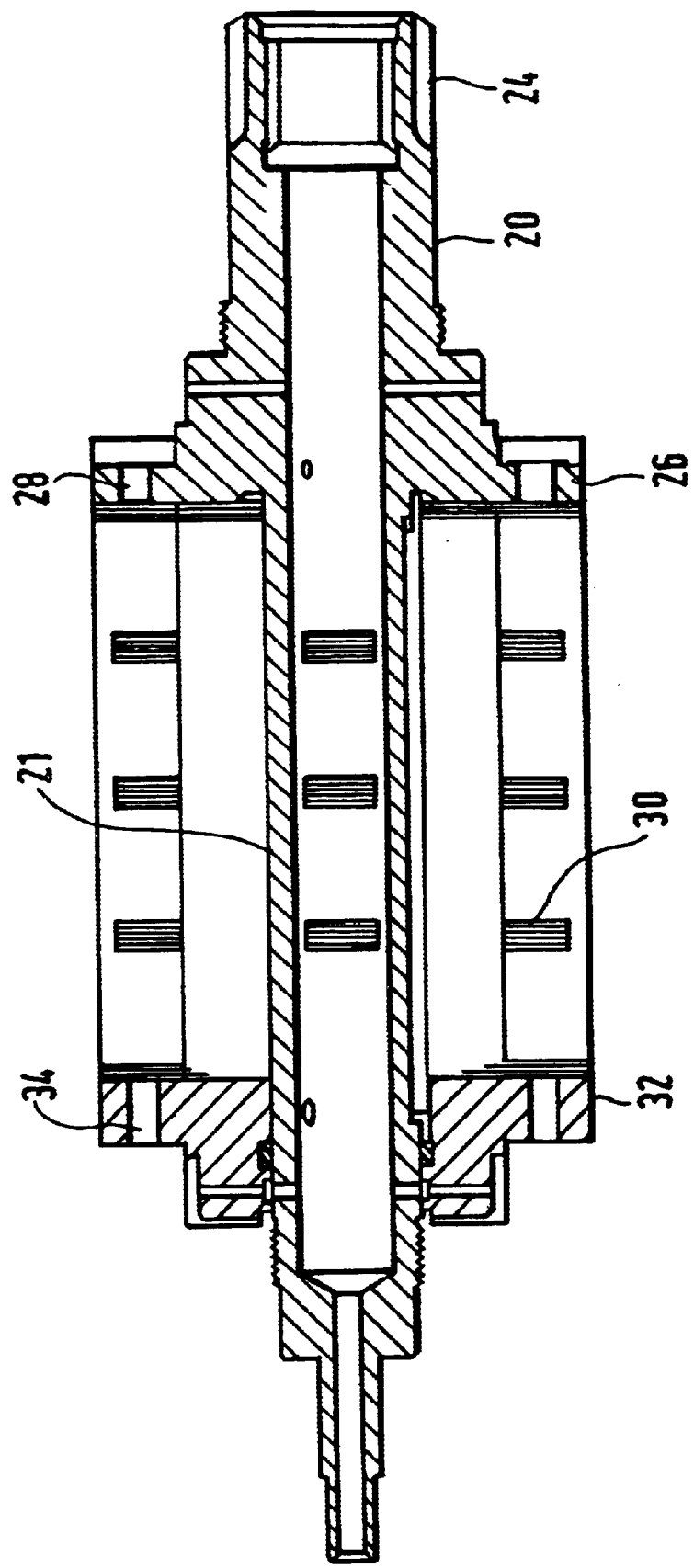
FIG. 2 is a schematic representation of a rotor constituting an embodiment of the present invention.

FIG. 2 schematically illustrates a rotor formed from a plurality of attachment laminations and rotor laminations. The rotor comprises a rotor shaft 20 which has a central portion 21 of uniform diameter which serves to carry the laminations. The end portions of the shaft 20 may be profiled to have different diameters so as to form portions which engage bearings and drive gears. As shown in FIG. 2, a toothed region 24 is provided to engage an drive gear (not shown), although splines could also be provided. A first flange 26 is integrally formed with the rotor shaft 20. The flange 26 provides an element against which the laminations can bear, and also serves to delimit the end position of the stack of laminations. The flange 26 has a plurality of through passages 28 formed therein which in use, allow fixing bolts to be used. A stack of laminations 30 is held captive between the first flange 26 and a further flange 32. The further flange 32 is detachable from the rotor shaft 20.

The further flange 32 has a plurality of through passages 34 formed therein which align, in use, with the passages 28 formed in the first flange and the passages 10 formed in the support laminations.

The laminated stack is formed by inserting the rotor laminations and the support laminations onto the shaft 20 until the required number of laminations has been inserted to form the stack. Compression fixings, for example bolts, are then passed through the holes 28, 10 and 34. Nuts are then attached to the bolts and tightened so as to hold the laminated stack 30 under compression. Alternatively passage 34 may be threaded and the securing bolts may engage this thread.

In general, the rotor laminations are used to form the majority of the laminated stack. However groups of support laminations are placed at regular intervals along the laminated stack. In the embodiment shown in FIG. 2, the groups of support laminations are placed such that the centre of the groups lie ¼, ½, and ¾ along the length of the laminated stack. Insulating bushes (not shown) are placed around the shaft of the connecting bolts in order to isolate the bolts electrically from the support laminations and also from at least one, and preferably both, of the flanges 26 and 32.

Figure 3:
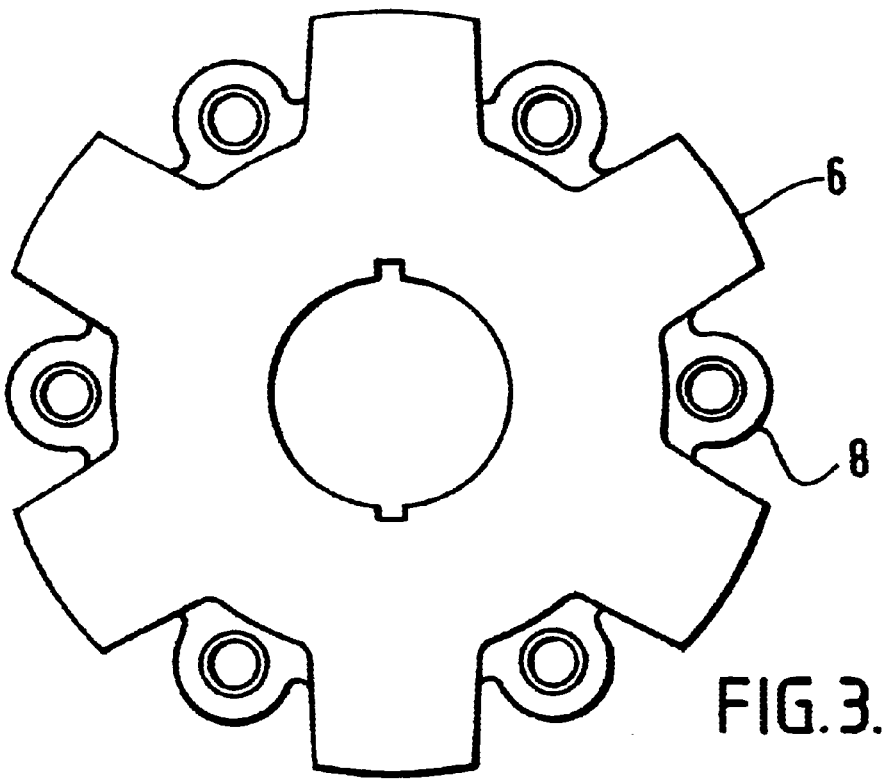
FIG. 3 is a view along the laminate stack of the rotor.

FIG. 3 illustrates an end view along the laminated stack, with the bolts removed for clarity, the poles 6 of the support laminations and the rotor laminations align, thereby effectively forming elongate rotor poles. The lugs 8 of the support laminations project into the inter-pole gap at the ¼, ½, and ¾ positions along the laminated stack.

Figure 4:
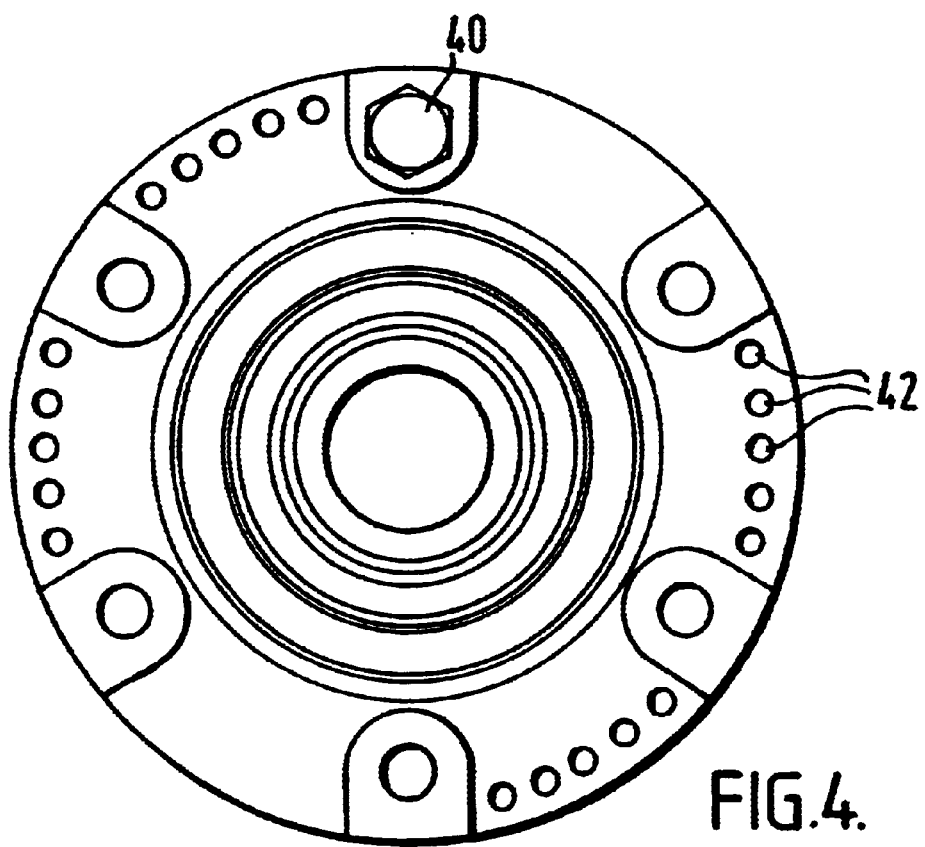
FIG. 4 is a view of an end flange of the rotor.

FIG. 4 illustrates an axial view along the rotor towards the flange 26. One bolt 40 is shown in position, the remaining bolts have been omitted for clarity. The flange 26 has a plurality of passages 42 formed near the circumference thereof which serve to balance the rotor and also reduce its weight, thereby reducing the inertia of the rotating machine.

Figure 5:
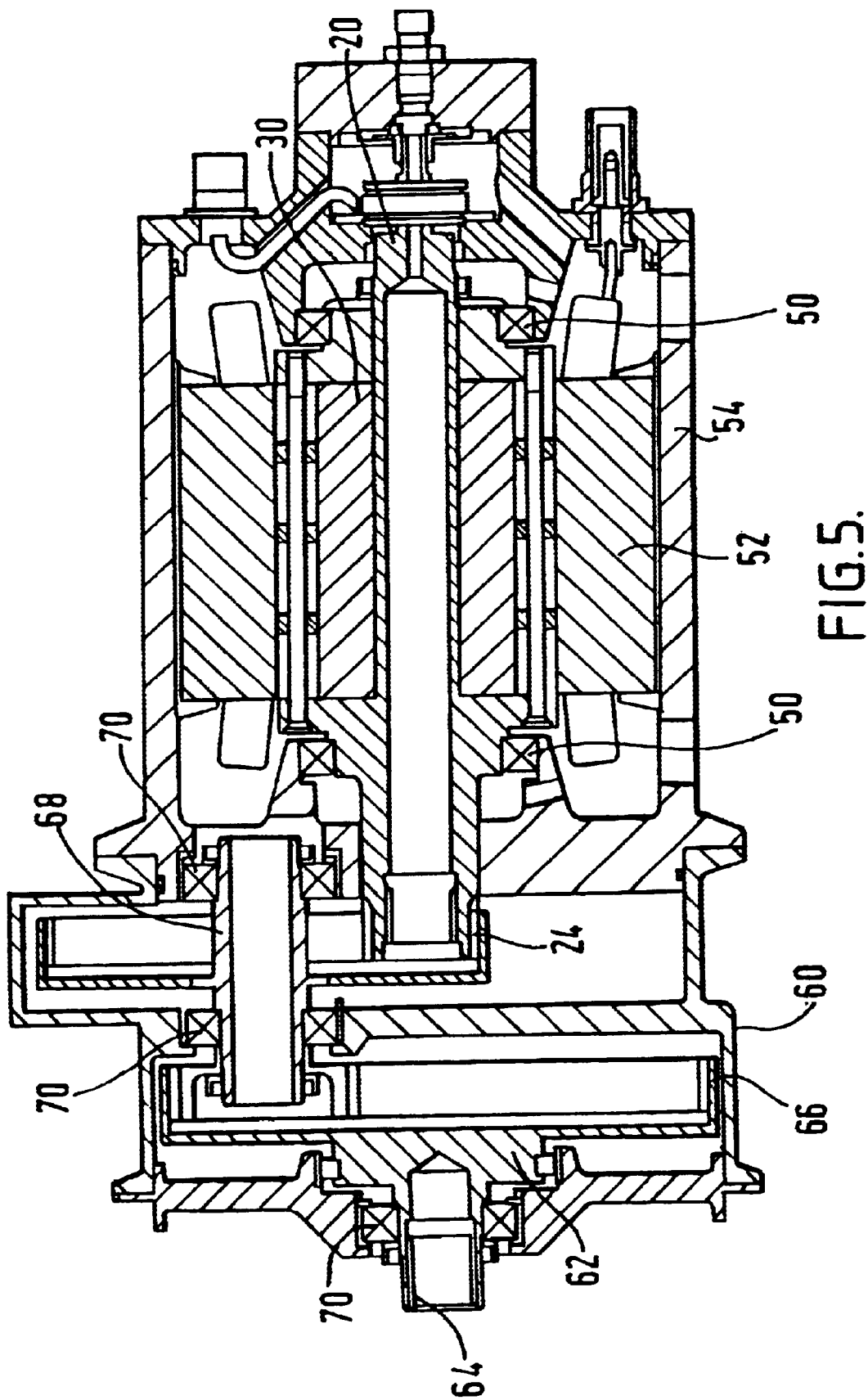
FIG. 5 is a cross section throuh a generator using a rotor constituting an embodiment of the present invention.

FIG. 5 schematically illustrates a generator constituting an embodiment of the present invention. The rotor 20 and laminated stack 30 is rotatably supported by journal bearings 50. A stator 52 comprising a plurality of coils wound round magnetic pole pieces encircles the rotor, and is attached to a generator housing 54. A step up gear box 60 is secured to a first end of the generator housing. An input gear 62 has a splined input portion for engaging a splined input shaft 64, such as the rear most end of the low speed spool of a gas turbine engine. Gear teeth are provided on an inwardly facing portion of a cup shaped element 66 which in turn engages with radially outward facing teeth of an intermediate shaft 68 which in turn has a cupped shaped portion carrying radially inward facing teeth which engage with gear teeth 24 of the rotor. Each of the input gear 62 and intermediate shaft 68 have bearings 70. In use, rotation of the low speed spool of the engine is stepped up twelve times and transmitted to the rotor via the gear box 60. Thus the rotor may be driven at high rotational rates, for example in excess of 36,000 rpm for an engine having a typical maximum low speed spool speed of around 3000 rpm. The bolts extending between the flanges 26 and 32 hold the laminate stack in compression, thereby ensuring that the laminations provide mutual support to one another and preventing motion of the laminations with respect to the shaft. However, as the rotational rate rises, the bolts would tend to adopt a bowed configuration due to their rapid acceleration around a circular path. The lugs of the support laminations serve to inhibit radial motion of the bolt to an unacceptable extent, thereby preventing the bolts from undergoing structural failure at high rotational rates.

Figure 6:
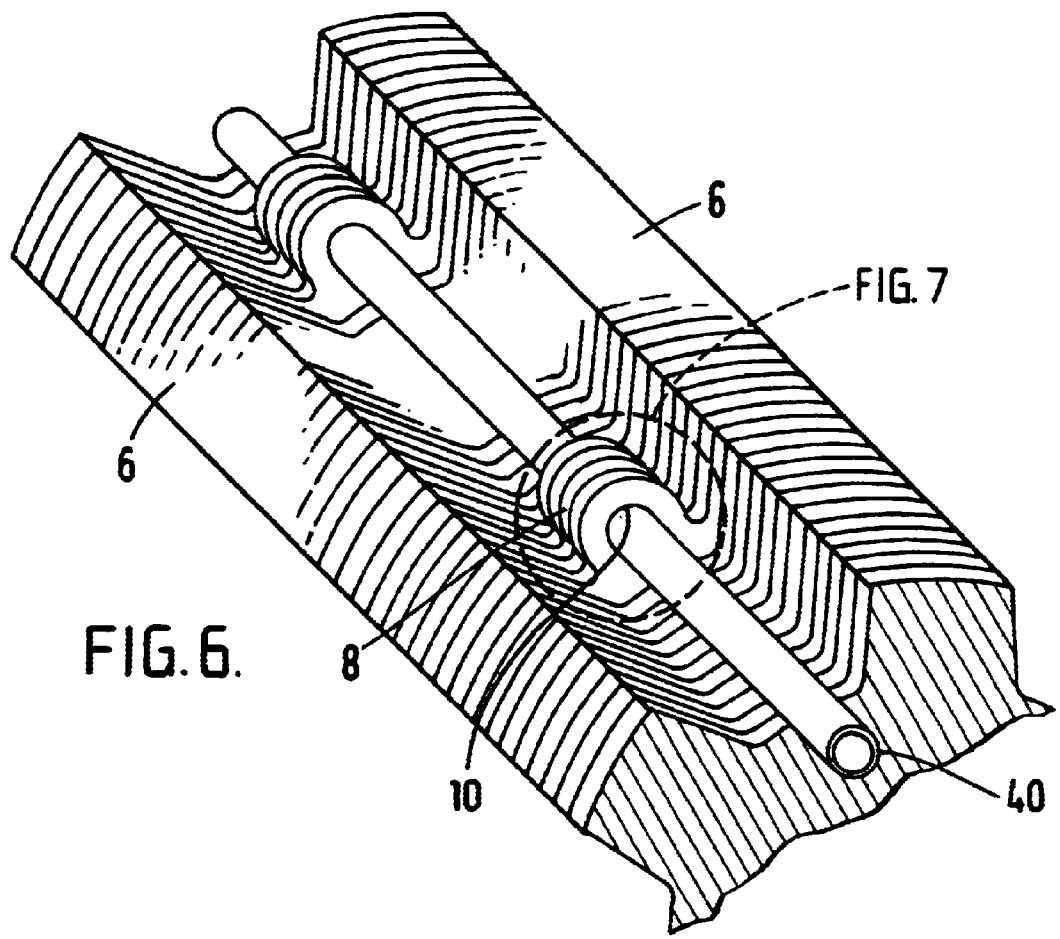
FIG. 6 is a perspective view of a rotor constituting an embodiment of the present invention.
Figure 7:
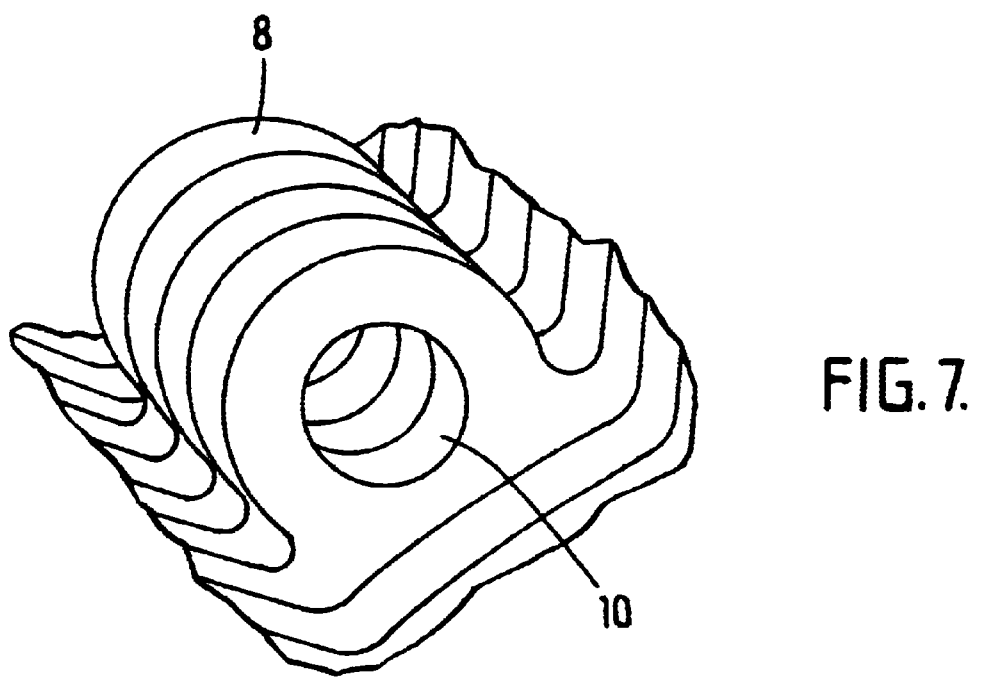
FIG. 7 is an enlarge perspective view of the attachment elements shown in FIG. 6.

FIGS. 6 and 7 are perspective views of the rotor illustrating how the attachment elements 8 of the laminations 2 are used for the radial support of the bolts.

The operation of the switched reluctance machine is well known to those skilled in the art and need not be described here in detail. However, in essence, the electromagnets on the stator are energised, in accordance with the position of the rotor, to induce a magnetic field in the poles of the rotor. The induced magnetic field, which rotates with the rotor, then cuts through the coils of the stator thereby inducing a voltage. The use of a switched reluctance generator has particular advantage within a gas turbine engine environment, in that the generator can be completely switched off by removing the excitation current to the stator coils, thereby providing controllability in the event of an electrical system failure. Additionally, the output voltage of the variable reluctance generator can be accurately controlled over a wide range of rotational speeds by varying the excitation current supplied to the stator coils. Additionally the absence of electrical connection to the rotor provides a robust and reliable machine.

It is thus possible to provide a rotor for an electrical machine, which rotor is capable of sustaining high rates of rotation without substantial deformation from the rotational axis. The use of thin laminations enhances electrical performance, whilst the mechanical problems associated with securing the thin laminations are overcome by bolting the laminations together between opposing flanges. Running the bolts through the air gap, rather than through the poles of the rotor reduces the degradation in the performance that is associated with passing bolts through the laminate stack, whilst the provision of retaining portions at various positions along the laminate stack protects the bolts against mechanical damage and failure due to the high rotational speeds.

What is claimed is:

1. A rotor for a switched reluctance electrical machine, comprising a shaft carrying a plurality of laminations having a plurality of first regions of a first radius defining poles of the rotor separated from one another by second regions of a second radius, wherein the first radius is greater than the second radius such that the poles are separated from one another by inter-pole spacings, and in which some but not all of the laminations are provided with extensions extending into some of the inter-pole spacings, the extensions having passages formed therein and the laminations being held together by fixing elements which pass through the passages in the extensions, and in which the extensions support the fixing elements against distortion during rotation of the rotor.

2. A rotor as claimed in claim 1, in which the laminations are less than 0.3 mm thick in order to reduce eddy current losses.

3. A rotor as claimed in claim 1, in which the laminations are held between opposing flanges under mechanical compression.

4. A rotor as claimed in claim 1, in which at least one of the flanges is integrally formed with the shaft.

5. A rotor as claimed in claim 1, in which at least one of the flanges is welded to the rotor shaft.

6. A rotor as claimed in claim 1, in which the laminations having the extensions are arranged in at least one group such that a plurality of such laminations co-operate to form a support region which holds the fixing elements against distortion due to centrifugal force.

7. A rotor as claimed in claim 6, in which the groups of laminations are spaced apart in a regular manner.

8. A rotor as claimed in claim 1, in which the laminations are insulated from one another by insulation therebetween.

9. A rotor as claimed in claim 1, in which the laminations are covered with an oxide deposit for insulation.

10. A rotor as claimed in claim 3, in which the fixing elements are bolts.

11. A rotor as claimed in claim 10, in which the bolts are insulated from the laminations by insulation.

12. A rotor as claimed in claim 10, in which the bolts are insulated from the flanges by insulation.

13. A rotor for a switched reluctance electrical machine, comprising:
a shaft; and
a plurality of laminations slidably engaged to the shaft via central apertures, the laminations having a plurality of pole regions of a first radius interposed between a plurality of inter-pole regions of a second radius,
wherein the first radius is greater than the second radius, wherein at least one, but not all, of the laminations is provided with at least one attachment extension in at least one of the inter-pole-regions, and wherein said attachment extension has a passage formed therein and the laminations are capable of being held together by a fixing element which passes through the passage in the attachment extension.

14. A rotor as claimed in claim 13, in which said at least one the laminations having at least one attachment extension has a plurality of attachment extensions symmetrically disposed about a central axis of said rotor, and a plurality of fixing elements hold said laminations in place along said shaft, each fixing element passing through at least one attachment extension, and said attachment extensions supporting said fixing elements against distortion due to centrifugal force.

15. A rotor as claimed in claim 14 in which said rotor has a plurality of laminations having a plurality of symmetrically disposed attachment extensions, and said laminations having said attachment extensions are spaced apart along an axis of said rotor in a regular manner.

16. A rotor as claimed in claim 15, in which the laminations having extensions are arranged in at least one group such that a plurality of such laminations co-operate to form a support region which holds the fixing elements against distortion due to centrifugal force.

17. A rotor as claimed in claim 13 in which the laminations are less than 0.3 mm thick in order to reduce eddy current losses.

* * * * *